Dec. 27, 1949  J. W. ALLEN  2,492,513
ELECTRICAL REGULATING SYSTEM FOR MOTOR GENERATORS
Filed March 12, 1948
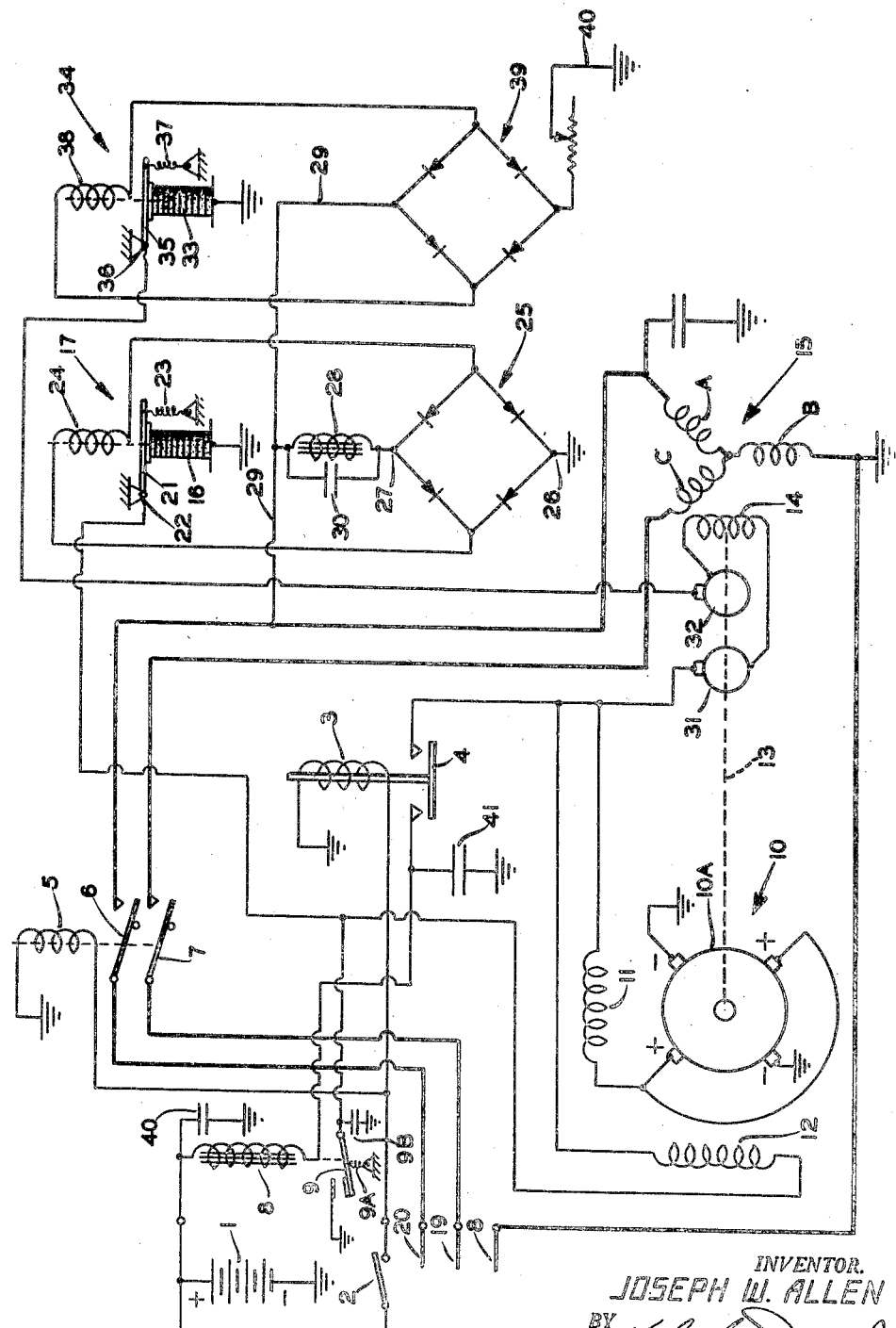
INVENTOR.
JOSEPH W. ALLEN
BY
- ATTORNEY -

Patented Dec. 27, 1949

2,492,513

UNITED STATES PATENT OFFICE 2,492,513

ELECTRICAL REGULATING SYSTEM FOR MOTOR-GENERATORS

Joseph W. Allen, Montclair, N. J., assignor to Bendix Aviation Corporation, Teterboro, N. J., a corporation of Delaware Application March 12, 1948, Serial No. 14,594

4 Claims. (Cl. 318—328)

The present invention relates to improvements in electrical regulating systems for a motor-generator or inverter of a type such as disclosed in U. S. application Serial No. 725,252, filed January 30, 1947, by Evan S. Smith and more particularly to an improved inductance (choke) relay serving the double function of a filter choke and a series coil for operating a switch to control a frequency regulator.

An object of the invention is to provide a novel choke coil needed for filtering purposes to actuate a relay switch to cut in a frequency regulator during starting when the generated voltage rises to nearly the operating value.

Another object of the invention is to provide a relay coil specifically designed to operate in a noise reduction network.

Another object of the invention is to provide a relay in which the functions of the filter choke is retained almost in toto and the relay switch is operated by the magnetic force of the choke coil, without the necessity of an additional series coil and magnetic structure.

These and other objects and features of the invention are pointed out in the following description in terms of the embodiment threof which is shown in the accompanying drawing. It is to be understood, however, that the drawing is for the purpose of illustration only, and is not designed as a definition of the limits of the invention, reference being had to the appended claims for this purpose.

The drawing is a diagrammatic showing of a system embodying the invention.

In the arrangement shown in the drawing, there is provided a source of direct current 1 which is connected through a switch 2 to an electromagnetic winding 3 which controls a starting switch 4 normally open. The switch 4 is biased to a closed position upon energization of the winding 3 so as to close a main D. C. input circuit.

There is further provided a transfer relay winding 5, which controls line switches 6 and 7. The energization of winding 5 is controlled by switch 2. Upon de-energization of relay 5, switches 6 and 7 are biased to an open position. There is further provided in the D. C. supply line a filter choke relay 8 which controls a relay switch 9 and forms a noise reduction circuit for preventing radio interference.

A spring 9A biases the switch 9 to an open position and a capacitor 9B is connected across the switch 9 to avoid arcing.

When switch 2 is opened, relay switch 4 also opens and thereby disconnects the D. C. source of electrical energy 1 from a D. C. motor indicated generally by the numeral 10 and having an armature winding 10A, series winding 11 and shunt field winding 12 of conventional type.

The motor 10 drives through a shaft 13, an exciting winding 14 of an alternator having three phase stator windings 15 including windings A, B and C.

The choke coil relay winding 8 is connected in the D. C. supply line for the armature winding 10A of the motor 10. Thus, the closing of the starting switch 4 by energization of the winding 3 connects the D. C. source 1 through the choke coil 8 to the armature winding 10A and the series field winding 11 of the motor 10. The choke coil 8 also controls a relay switch 9. Due to the starting inrush of current through the filter choke relay 8, there is established a strong flux sufficient to attract the relay switch 9 to a closed position.

Until the operating speed of the motor 10 is nearly reached, it is desirable to keep the full current in the shunt field winding 12 of the motor 10 to effect a desirable, quick starting of the motor 10. The switch 9 of the filter choke relay 8 is arranged when in the closed position to shunt out of operation a variable resistance or carbon pile element 16 of a frequency regulator 17. Upon the opening of switch 9 the variable resistance 16 is connected in series with the shunt field 12 of the motor 9 and the source of electrical energy 1.

As the armature 10A speeds up, the armature current through the filter choke relay 8 decreases and by suitable adjustment of the spring 9A the switch 9 can be made to open at a predetermined armature current below the full load value and indicative of a speed approaching that of the normal operating range. When the switch 9 opens, the short across the carbon pile 16 is removed allowing the latter to hold the armature speed constant, as will be explained.

The carbon pile regulator 17 may be of a type disclosed and claimed in U. S. Patent No. 2,427,805, granted September 23, 1947, in the name of William G. Neild, and assigned to Bendix Aviation Corporation.

The frequency regulator is shown diagrammatically as including an armature 21, pivoted at 22 and biased under tension of spring 23 in a direction tending to decrease the resistance of the pile 16 and thereby increase the energization of the shunt field 12 so as to effect a decrease in the speed of the motor 9.

An electromagnetic winding 24 biases the armature 21 in a direction opposing the spring 23 and tending to increase the resistance of the carbon pile 16 so as to decrease the energization of the shunt field 12 and thereby increase the speed of the motor 9.

The control winding 24 is connected across the output of a rectifier 25. The rectifier 25 has A. C. input connections 26 and 27. The input connection 26 is ground connected to the grounded winding B of the alternator winding 15. The opposite input connection 27 of the rectifier 25 is connected through an iron core reactance or frequency sensitive choke coil 28 and a conductor 29 to the winding A of the alternator winding 15.

A capacitor 30 shunts the choke coil 28 to increase the sensitivity of the coil 28.

The series field 11 of the motor 10 tends to increase the difficulty of regulating the speed of the motor 10, but the same is needed to provide the desired starting characteristic of the motor 10.

Moreover, upon the speed of the motor 10 approaching its normal operating range the switch 9 opens the shunt circuit for the regulator 17 so as to permit the same to be placed in operation.

At a constant output voltage of the alternator 15, the current energizing the winding 24 tends, due to the action of the frequency sensitive choke coil 28, to decrease upon an increase in the regulated frequency and to increase upon a decrease in the regulated frequency. This action in turn regulates through the carbon pile 16 the speed of the motor 10 by varying the excitation of the shunt field winding 12 so as to maintain the output frequency of the alternator substantially constant.

The exciting winding 14 is connected to slip rings 31 and 32. The ring 31 is connected by a suitable conductor to one contact of the starting switch 4, while the ring 32 is connected by a suitable conductor to one end of a variable resistance or carbon pile element 33 of a voltage regulator 34. The opposite end of the carbon pile element 33 is grounded so that upon the closing of the starting switch 4 the source of electrical energy 1 is connected through the variable resistance 33 to the exciting winding 14 of the alternator.

The carbon pile regulator 34 may be of a type disclosed and claimed in the aforenoted U. S. Patent No. 2,427,805.

The voltage regulator is shown diagrammatically as including an armature 35, pivoted at 36 and biased under tension of spring 37 in a direction tending to decrease the resistance of the pile 33 and thereby increasing the energization of the exciting winding 14 so as to effect an increase in the voltage output of the alternator.

An electromagnetic winding 38 biases the armature 35 in a direction opposing the spring 37 and tending to increase the resistance of the carbon pile 33 so as to decrease the energization of the exciting winding 14 and thereby decrease the output voltage of the alternator.

The control coil 38 is connected to the output of a rectifier 39 having an A. C. input connected through conductor 29 and a grounded connection 40 across the windings A and B of the alternator stator winding 15. Thus the regulator 34 tends to regulate the output voltage of the alternator.

From the foregoing, it will be seen that upon a decrease in the load across the lines 18, 19 and 20, the output voltage of the alternator tends to rise, which tendency is but partially overcome by the voltage regulator 34 and the motor 10 tends to speed up. When the motor 10 tends to speed up, the current in the frequency regulator coil 24 tends to decrease so as to effect a decrease in the motor speed.

It may be noted that the current in the frequency regulator coil 24 decreases upon an increase in output frequency of the alternator over the working range of the regulator 17, while an opposite action is effected upon a decrease in the output frequency of the alternator.

It will be seen from the foregoing that the inductance filter choke winding 8 consisting of series turns and an iron core is used with associated condensers 40 and 41 to provide a noise reduction filter network. The structure of the choke 8 needed for filtering purposes, is utilized further to actuate a relay switch arm 9 to place the frequency regulator 17 for the motor 10 and alternator 15, in and out of operation dependent upon the load current for the motor 10.

In an inverter or motor-generator where a speed regulator, such as a carbon pile, is used during starting, it is desirable that a minimum of resistance be in the external shunt field circuit of the motor during starting to assure positive and rapid acceleration and also that such external resistance be readily available for speed control functions.

As shown in the drawing, when the circuit to the motor 10 is completed to a power source 1 by closing switch 2, high starting current flows through choke 8 establishing a strong flux and attracting the relay switch arm 9 toward the core of the choke 8 and closing a circuit to shunt the carbon pile 16 of the frequency regulator 17.

As the speed of the motor 10 increases, the current to the armature 10A decreases and by suitable adjustment of a spring 9A, the relay switch 9 can be made to open at a predetermined lower armature current.

When released the switch 9 opens, removing the short across the carbon pile 16 of the frequency regulator 17 so as to permit the latter to hold the speed of the armature 10A constant, as previously described.

In making use of the flux in the filter choke 8 to control the actuation of the relay switch 9, the use of a separate coil for actuating the relay switch is avoided and the coil 8 serves the double function of providing a noise reduction filter and a control for the frequency regulator 17.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. In a system of the character described, the combination comprising an alternating current generator, an electric motor for driving said generator, a shunt field winding for controlling the speed of said motor, a variable resistance element for regulating the energization of said shunt field winding, an electromagnetic winding for operating said variable resistance element, a rectifier having an alternating current input and a direct current output, said electromagnetic winding connected across said direct current output, a circuit connecting said alternating current input across the output of said generator, said circuit including an iron core reactance frequency responsive winding, a noise reduction filter network in the electrical input for said motor, said network including an inductance filter choke coil, a relay for shunting said variable resistance element in response to electromagnetic force of said choke coil upon said generator being driven by said motor at a frequency less than a predetermined minimum frequency, said minimum frequency approaching normal operating speed of said motor, and said relay being released by said choke coil so as to permit operation of said variable resistance element upon the load current decreasing below a predetermined value indicative of a driven speed of the motor greater than said minimum frequency.

2. In a system of the character described, the combination comprising an alternating current generator, an electric motor for driving said generator, a shunt field winding for controlling the speed of said motor, a variable resistance element for regulating the energization of said shunt field winding, an electromagnetic winding for operating said variable resistance element, a rectifier having an alternating current input and a direct current output, said electromagnetic winding connected across said direct current output, a circuit connecting said alternating current input across the output of said generator, said circuit including an iron core frequency sensitive winding, a direct current input circuit for said motor including a filter network, a relay mechanism including an electromagnetic winding forming a filter choke connected in the filter network and input of said motor, a relay switch member operated by said last mentioned electromagnetic winding and controlling operation of said variable resistance element, said last mentioned electromagnetic winding biasing said switch member in one sense so as to shunt said variable resistance element at a current input to said motor in excess of a predetermined value and indicative of a driven speed of said motor less than a predetermined minimum frequency, and spring means biasing said switch member in an opposite sense so as to open said shunt circuit at a current input to said motor less than said predetermined value and indicative of a driven speed of the motor greater than said predetermined minimum frequency.

3. In a system of the character described, the combination comprising an alternating current generator, an electric motor for driving said generator, said motor having an electrical input and a winding to control the speed thereof, means for regulating the energization of the speed control winding, a frequency responsive circuit for operatively connecting said regulating means to the output of said generator, a noise reduction filter network in the electrical input of said motor, said network including an inductance filter choke coil affected by load current of said motor, a relay to effect in starting, operation of said regulating means, in response to an electromagnetic force of said choke coil indicative of a driven speed of the motor in excess of a predetermined minimum frequency and approaching a normal operative condition of said motor driven generator.

4. In a system of the character described, the combination comprising an alternating current generator, an electric motor for driving said generator, said motor having an electrical input and a winding to control the speed thereof, means for regulating the energization of the speed control winding, a frequency responsive circuit for operatively connecting said regulating means to the output of said generator, a noise reduction filter network in the electrical input of said motor, said network including an inductance filter choke coil affected by load current of said motor, relay means responsive to the electromagnetic force of said choke coil to maintain said regulating means inoperative until the load current of said motor decreases to below a predetermined value indicative of a speed of the motor approaching a normal operative condition whereupon said relay means effects operation of said regulating means.

JOSEPH W. ALLEN.

REFERENCES CITED

The following references are of record in the file of this patent:

UNITED STATES PATENTS

| Number | Name | Date |
| --- | --- | --- |
| 2,284,649 | Grabau | June 2, 1942 |

FOREIGN PATENTS

| Number | Country | Date |
| --- | --- | --- |
| 264,257 | Italy | Apr. 22, 1929 |